United States Patent
Mincey

(10) Patent No.: US 9,316,445 B2
(45) Date of Patent: Apr. 19, 2016

(54) SPIDER DIFFUSER SYSTEM

(71) Applicant: CROM, LLC, Gainesville, FL (US)

(72) Inventor: Christopher Talmadge Mincey, Gainesville, FL (US)

(73) Assignee: CROM, LLC, Gainesville, FL (US)

( * ) Notice: Subject to any disclaimer, the term of this patent is extended or adjusted under 35 U.S.C. 154(b) by 0 days.

(21) Appl. No.: 14/004,767

(22) PCT Filed: Mar. 14, 2013

(86) PCT No.: PCT/US2013/031561
§ 371 (c)(1),
(2) Date: Sep. 12, 2013

(87) PCT Pub. No.: WO2014/142902
PCT Pub. Date: Sep. 18, 2014

(65) Prior Publication Data
US 2015/0122356 A1    May 7, 2015

(51) Int. Cl.
*F28D 20/00* (2006.01)
*F24J 2/34* (2006.01)
*F16L 41/03* (2006.01)
*F15B 1/26* (2006.01)

(52) U.S. Cl.
CPC ............. *F28D 20/0039* (2013.01); *F15B 1/26* (2013.01); *F16L 41/03* (2013.01); *F24J 2/345* (2013.01); *F28D 20/0043* (2013.01); *F28D 2020/0069* (2013.01); *Y02E 60/142* (2013.01); *Y02E 60/145* (2013.01); *Y10T 137/85938* (2015.04); *Y10T 137/86372* (2015.04)

(58) Field of Classification Search
CPC . Y02E 60/145; Y02E 60/142; F28D 20/0039; F28D 2020/0069; F24J 2/345; F16L 41/03; Y10T 137/85938; Y10T 137/86372
USPC ............ 165/10, 157, 159, 902; 126/640, 400; 137/592, 561 A
See application file for complete search history.

(56) References Cited

U.S. PATENT DOCUMENTS 4,643,212 A   2/1987  Rothrock
4,987,922 A   1/1991  Andrepont et al.
(Continued)

FOREIGN PATENT DOCUMENTS

JP    2004053140    2/2004

*Primary Examiner* — Atif Chaudry
(74) *Attorney, Agent, or Firm* — Saliwanchik, Lloyd & Eisenschenk

(57) ABSTRACT

A thermal energy storage installation including a thermal energy storage tank and a spider diffuser system mounted in said tank. The TES tank comprises an outer wall having a generally cylindrical inner surface surrounding a hollow internal space in the tank. The spider diffuser system comprises a centrally disposed manifold structure that is disposed in vertically spaced relationship relative to a thermocline formed in a temperature stratifiable liquid in the space during operation of the tank. The manifold structure has an internal chamber and includes an opening for introduction of a said liquid into the chamber or discharge of a said liquid from the chamber. The spider diffuser system also includes a diffuser pipe assembly comprising a plurality of elongated diffuser legs. Each of the legs is attached to the manifold structure so as to extend generally radially outwardly from the structure and toward the inner surface of the tank. Each of the legs has an internal channel in fluid communication with the chamber. Each leg also has a plurality of apertures distributed along the length thereof, which apertures intercommunicate the channel with the space.

32 Claims, 8 Drawing Sheets

(56) References Cited

U.S. PATENT DOCUMENTS

| | | |
|---|---|---|
| 5,103,863 A | 4/1992 | Powers |
| 5,137,053 A | 8/1992 | Kale |
| 5,176,161 A | 1/1993 | Peters et al. |
| 5,181,537 A * | 1/1993 | Powers ............... 137/561 A |
| 5,197,513 A | 3/1993 | Todd et al. |
| 5,381,860 A * | 1/1995 | Mather ............... F24F 3/06 137/592 |
| 5,386,871 A | 2/1995 | Master et al. |
| 6,290,433 B2 * | 9/2001 | Poncelet et al. ............... 406/181 |
| 6,318,065 B1 * | 11/2001 | Pierson ............... 60/783 |
| 6,920,984 B2 | 7/2005 | Agnew |
| 6,994,111 B2 | 2/2006 | Cox |
| 7,069,975 B1 | 7/2006 | Haws et al. |
| 2008/0115918 A1 | 5/2008 | Kerber et al. |
| 2009/0056814 A1 | 3/2009 | Rohde |
| 2010/0025031 A1 | 2/2010 | Liu et al. |
| 2011/0168159 A1 | 7/2011 | Lataperez et al. |
| 2011/0271953 A1 | 11/2011 | Wortmann et al. |
| 2013/0023044 A1 * | 1/2013 | Gleason ............... 435/292.1 |

* cited by examiner

SPIDER DIFFUSER SYSTEM

BACKGROUND OF THE INVENTION

1. Field of the Invention

The invention of the present application relates to the general field known as load shifting or peak shaving. More particularly, the invention relates to Thermal Energy Storage (TES) installations employing large tanks wherein a thermal transition zone, often referred to as a thermocline, is developed in a temperature stratifiable liquid in the tank. The thermocline separates a chilled liquid on one side of the thermocline from a relatively warmer liquid on the other side of the thermocline. In the case of water and aqueous solutions, for example, the cooler denser liquid will be situated below the thermocline, while the warmer less dense liquid will be situated above the thermocline. Even more particularly, the invention relates to diffusers disposed in such tanks for the purpose of minimizing internal mixing as liquid is introduced into and/or discharged from the tank, all for the purpose of establishing minimally sized thermoclines and reducing the overall cost of TES tank installations and operations.

2. Prior Art Background

The principal purpose of a diffuser in a TES tank is to slowly introduce a temperature stratifiable fluid into the tank in such a way that mixing within the tank is negligible. This lack of mixing within the TES tank allows the fluid to stratify and be stored at two different temperatures. The methods used for designing standard prior art octagonal diffusers are fairly straightforward. Such design procedures are detailed in a publication of the American Society of Heating, Refrigerating and Air-Conditioning Engineers (ASHRAE) entitled "Design Guide for Cool Thermal Storage" and authored by Charles Dorgan, PE and James Elleson, PE.

Naturally stratified TES tanks take advantage, for example, of the normal differences in the density of water at different temperatures to separate chilled water from warmer water returning from an air handling system, for example. By limiting the inlet and outlet velocities of the water, internal mixing may be minimized whereby buoyancy forces dominate, thus allowing the water to stratify. This allows warm water to be stacked on top of cooler denser water without the need for a physical membrane to separate them. A layer of water, generally referred to as a thermocline, is disposed between and separates warm return water from cold stored water. A major key for optimization of the performance of thermal storage is the design of an internal diffuser adapted to create the thinnest possible thermocline. The operation of a conventional prior art TES installation is illustrated in Prior art FIGS. 15A and 15B. FIG. 15A schematically illustrates the characteristic relative horizontal position of the thermocline 212 during off-peak hours, while FIG. 15B schematically illustrates the characteristic relative horizontal position of the thermocline 212 during peak hours. In each case, the relatively warmer water is shown as small Xs and the relatively colder water is shown as small Os. As is well known to those of ordinary skill in the TES field, depending often upon momentary fluctuations in demand, the thermocline is continuously in motion, up and down in the tank, throughout both the on and off peak hours.

Institutional electrical energy usage, for example, follows a bell curve with peaks during the day and valleys overnight. Local power plants must have the capacity to handle the peak periods. Accordingly, power plants are often oversized so as to meet the high demands during peak periods and are forced to charge demand fees to offset the cost of excess capacity. During periods of low demand (generally in the evenings), plants must be kept running and producing electricity, often with excess capacity. In many cases, energy produced during low demand periods is offered to large commercial users at a reduced rate. TES takes advantage of these low rates by chilling water for 'the cooling systems at night and storing it in insulated tanks for use during periods of peak demand. This is known as load shifting or peak shaving, depending on the specific geographic location and utility incentives. Often the payback of the initial construction cost of a TES installation can be very short.

As mentioned above, diffusers may be disposed in TES tanks for the purpose of minimizing internal mixing as liquid is introduced into and/or discharged from the tank. The main purpose of the diffuser is to introduce liquid into the tank and remove liquid from the tank at very low velocities, thus eliminating or at least minimizing mixing of the warm liquid and the cold liquid within the tank, whereby both warmer liquid and relatively colder liquid may be stored in the same tank. Proper stratification of the liquid may be achieved only by proper diffuser design so as to achieve the desired low design flow rates.

Many diffuser designs are described in ASHRAE publications, including octagonal and H-shaped diffusers. Currently, many companies involved in designing and constructing TES tanks utilize the octagonal diffuser layout. Such a design is currently a standard in the industry, and is outlined in many ASHRAE publications. One of the shortcomings of this design is that the construction of the octagonal diffuser requires large quantities of piping and pressure fittings. Long lengths of pipe and the corresponding large quantities of fittings may often cause the octagonal diffusers to be overly costly to build and utilize.

As a result of the foregoing, the industry is continually searching for a diffuser design which reduces and minimizes construction and operational costs as well as the thickness of the thermocline. By reducing and/or eliminating mixing of the chilled and warmer liquids, a thinner thermocline with its reduced volume may be developed between the liquids whereby the holding capacity of the tank is improved.

In addition to the foregoing, TES systems may be called upon for use in connection with temperature stratifiable fluids and liquids other than water. For example, see U.S. Pat. No. 5,176,161, col. 1. 11. 24-41, where a number of temperature stratifiable liquids are mentioned. It is to be noted in this regard that in some of the stratifiable liquids, the density of the warmer layer will be greater than that of the colder layer, so in those cases the colder layer will be on top.

BRIEF SUMMARY OF THE INVENTION

In accordance with the concepts and principles of the invention of the present application, a novel spider diffuser system for use in a TES tank as a part of a TES installation is provided. The tank within which the novel spider diffuser system of the invention is to be used, has an outer wall with a generally cylindrical inner surface surrounding a hollow internal space.

The novel spider diffuser system is arranged for being mounted in the space and located in vertically spaced relationship relative to a thermocline formed in a temperature stratifiable liquid in the space during operation of the tank. It is to be noted here, that the design of the novel spider diffuser system of the invention of the present application should be suitable for use with any and all temperature stratifiable liquids used in connection with TES installations and operations.

The spider diffuser system includes a manifold structure having an internal chamber. The manifold structure also includes an opening for introduction of the liquid into the chamber or discharge of the liquid from the chamber.

In addition the system has a diffuser pipe assembly comprising a plurality of elongated diffuser legs which are each attached to the manifold structure so as to extend generally outwardly from the manifold structure and toward the inner surface of the walls of the tank. The legs each have an internal channel that is in fluid communication with the chamber during operation of the system, and there are a plurality of apertures distributed along the length of each leg for intercommunicating the channel with the space in the tank.

In general usage, the temperature stratifiable liquid in the space may preferably be water.

The chamber opening is either for introduction of the liquid into the chamber or for discharge of liquid from the chamber, depending upon the phase of operation of the system.

Ideally the legs may extend generally radially outwardly from the manifold structure.

Desirably the manifold structure may have a decagonal, generally horizontal cross-sectional configuration and a peripheral wall including ten upright wall segments.

Preferably the spider diffuser system may include a leg for each segment of the wall.

In a preferred form of the invention, the manifold structure may include an internal baffle arrangement disposed in said chamber. Ideally the baffle arrangement may include a plurality of upright partitions which are arranged to divide the chamber into a number of equal sections.

In another aspect of the invention, the apertures may generally be disposed on the leg so as to face away from the thermocline. Desirably the apertures may be spaced equidistant apart along the length of the leg. Preferably, the apertures comprise slots extending laterally across the legs.

In a much desired form of the invention, the arrangement of the manifold structure is such that the water entering each diffuser leg therefrom has a velocity of no more than about 1 ft/sec.

In accordance with another aspect of the invention, the same may be directed to a tank which includes the novel spider diffuser system mounted therein. In still another aspect, the invention may be directed to an installation which comprises a tank that includes the novel spider diffuser system mounted therein.

With the novel spider diffuser structure described above, including the manifold structure and the diffuser legs, low diffuser leg aperture velocities and thus thermoclines of minimal thickness are produced. The manifold structure facilitates the distribution of liquid to and through the diffuser legs at low liquid flow rates. By designing for low fluid exit velocities from the diffuser leg apertures and maintaining low Froude and Reynolds numbers in the overall operation, the spider diffuser system operates so as to maximize stratification of the fluid and minimize the thickness of the thermocline. Ideally the apertures of the legs may be disposed on the diffuser leg so as to face away from the thermocline.

A spider diffuser system embodying the concepts and principles of the invention is described herein. A benefit of such a novel system is that design procedures that have been employed previously with prior art tanks, such as, for example, the octagonal diffuser, may be utilized while the number of components and construction costs are both reduced. In addition, the novel system of the invention facilitates the achievement of thermoclines having reduced thickness. This new system includes a centrally located manifold structure in the shape of a decagon, or other polygon. In fact, the manifold structure might just as well have any number of substitute cross-sectional shapes, such as, for example, octagonal, triangular, cylindrical, rectangular, etc. The system may include diffuser legs extending outwardly from the centrally located manifold structure. The design basis of the spider diffuser system of the invention is to allow introduction of a high-velocity flow into the manifold structure where the flow area is then increased by a factor of 10±. This slows the incoming fluid to an appropriate velocity and distributes the fluid evenly into the outwardly extending diffuser legs.

DETAILED DESCRIPTION OF THE INVENTION

Figure 1:
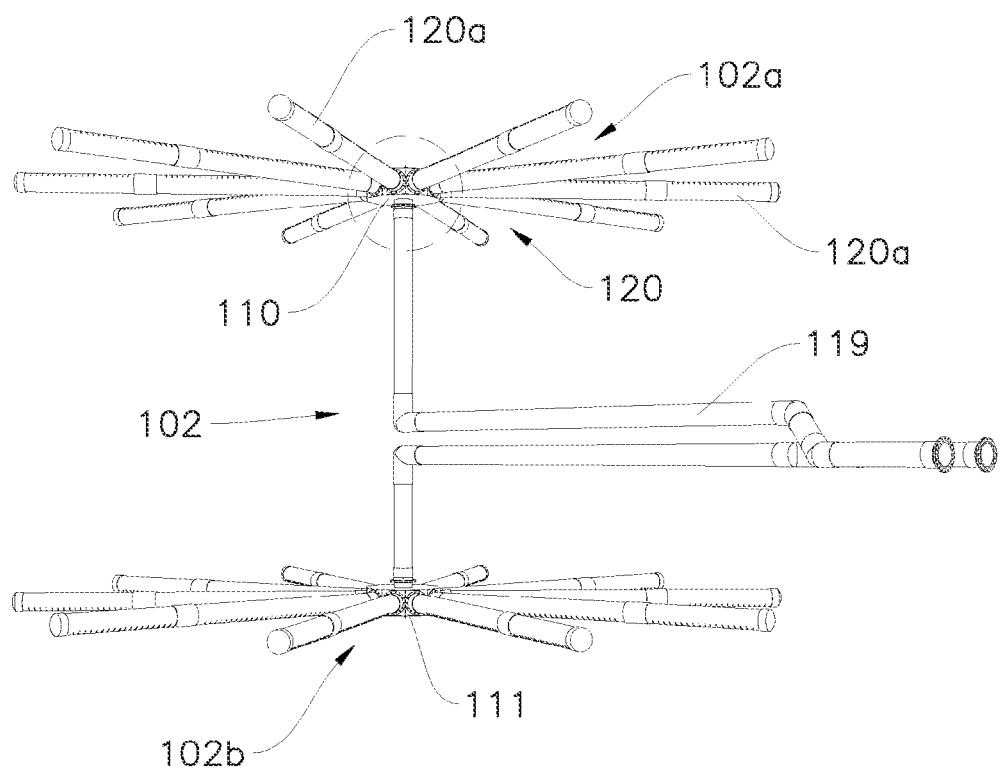
FIG. 1 is a perspective view illustrating oppositely facing spider diffuser systems, each of which embodies the concepts and principles of the invention.
Figure 2:
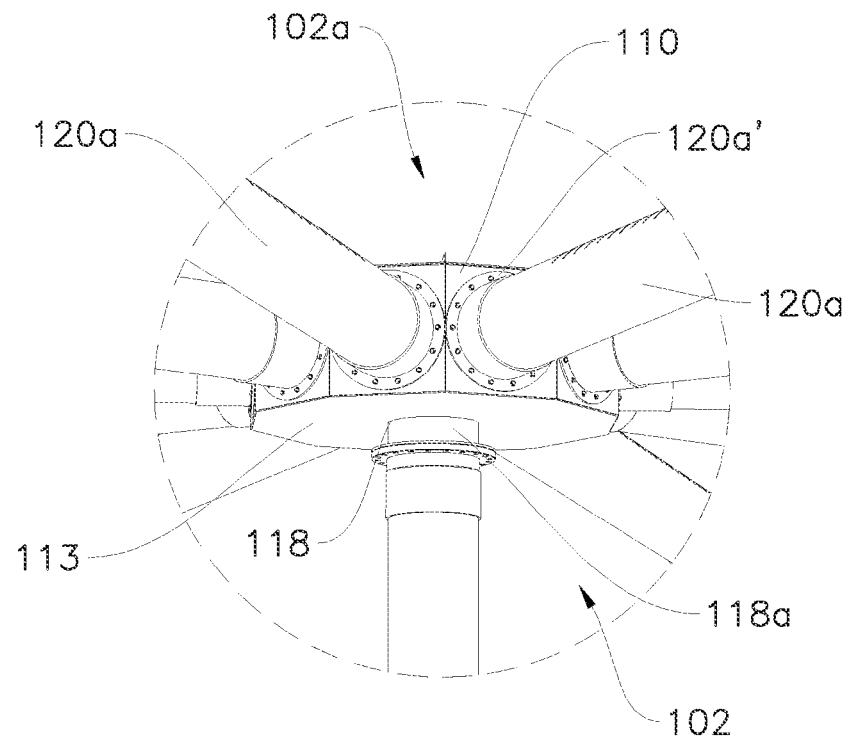
FIG. 2 is an enlarged perspective view further illustrating encircled details of the upper spider diffuser system of FIG. 1.

A spider diffuser system assemblage for use in a TES tank 100 (See FIG. 3.) and which embodies the principles and concepts of the invention, is shown in FIG. 1, where it is referred to broadly by the reference numeral 102. As can be seen in FIG. 1, a complete operational spider diffuser system assemblage 102 may include two spider diffuser systems 102a and 162b which are positioned in oppositely facing dispositions. In a preferred embodiment shown in the drawings, the spider diffuser systems 102a and 102b may be identical, so only the upper system 102a will be described in detail herein. In accordance with the broader aspects of the invention, however, these systems do not necessarily need to be identical.

Figure 3:
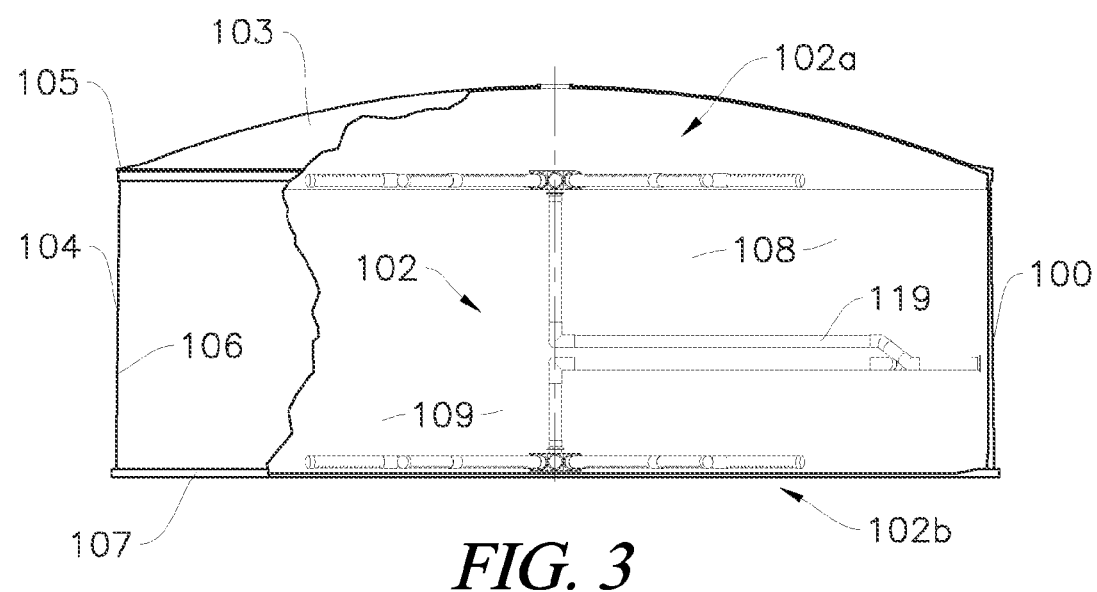
FIG. 3 is an elevational view of a TES installation including a TES tank and comprising the spider diffuser system of FIG. 1, wherein parts have been broken away for increased clarity of the manner in which the spider system is arranged in the tank.
Figure 4:
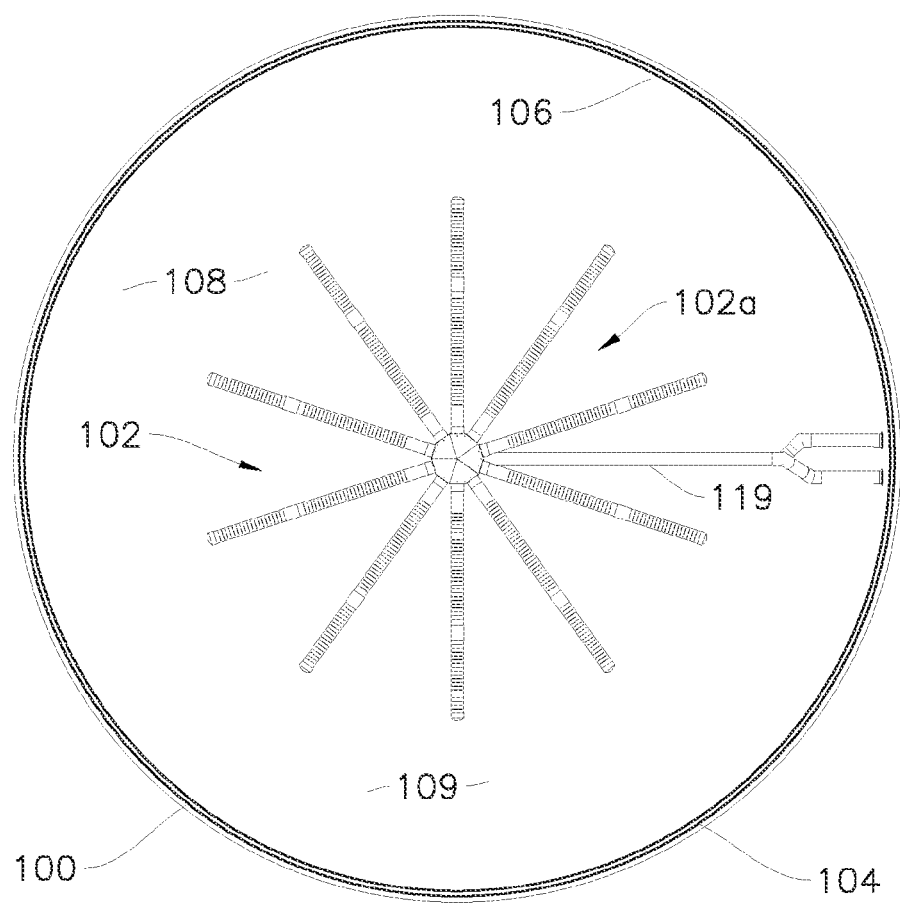
FIG. 4 is a top plan view of the TES tank of FIG. 3 with dome removed for increased clarity.

With reference to FIGS. 3 and 4, tank 100 has a peripheral wall 104 having a generally cylindrical inner surface 106 surrounding a hollow internal space 108. Tank 100 may be constructed of any of a multitude of materials commonly known and used in the liquid storage and containment field. For example, tank 100 may be a prestressed concrete tank of the sort well known to those of ordinary skill in the field of fluid storage. Depending on the operational mode of the overall TES process, either of the systems 102a, 102b may be used for introducing a temperature stratifiable liquid 109 into TES tank 100, in which case the other of the systems 102a, 102b will be used for collecting and discharging the temperature stratifiable liquid from tank 100.

Generally speaking, the spider diffuser system assemblage 102 may be installed in the tank 100, essentially as shown in FIGS. 3 and 4. With reference to FIG. 3, the upper spider diffuser system 102a may be disposed at approximately the same height as the junction 105 between the dome 103 and the wall 104 of tank 100. The lower spider diffuser system 102b may be disposed as close to floor 107 of tank 100 as may be practical from a tank construction and operation viewpoint. The exact vertical positioning of the upper and lower spider diffuser systems, however, is a function of the unique design of each installation, and in general the position will be determined empirically.

The assemblage 102 may be constructed of any one of a myriad of materials, including fiberglass, steel, polyvinyl chloride (PVC) and/or stainless steel. Moreover, the separate components of assemblage 102 may be made of the same or different materials. A much preferred material, however, is carbon steel for all components.

Spider diffuser system 102a comprises a manifold structure 110 arranged for being disposed in space 108 in vertically spaced relationship above a thermocline formed in temperature stratifiable liquid 109 in space 108 during operation of TES tank 100. On the other hand, manifold structure 111 of system 102b may be arranged for being disposed in space 108 in vertically spaced relationship below the thermocline. That is to say, the thermocline is always disposed between the spider diffuser systems 102a, 102b.

As discussed above, TES processes may be adapted for use with a variety of different temperature stratifiable liquids. In the preferred embodiment described herein, however, the liquid is water.

Figure 9:
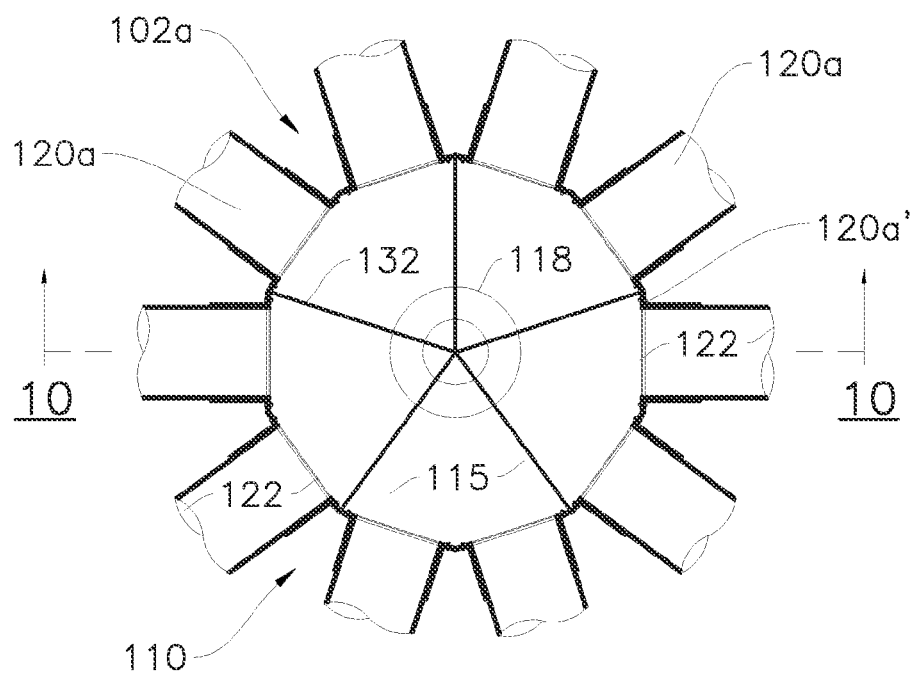
FIG. 9 is an enlarged cross-sectional view of the upper spider diffuser system of FIG. 1, which view is taken essentially along the line 9-9 of FIG. 10.
Figure 10:
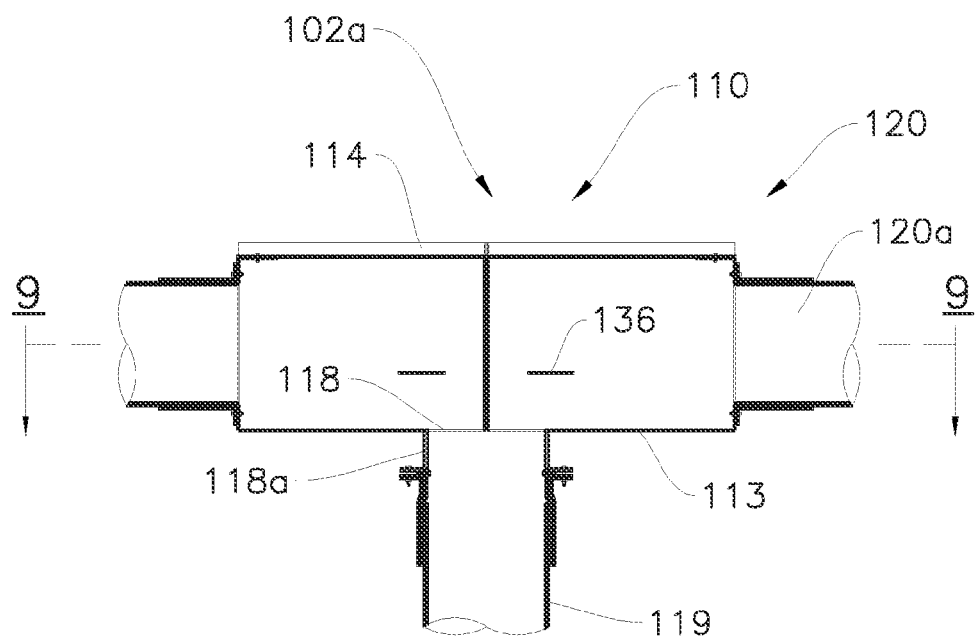
FIG. 10 is a cross-sectional view of the upper spider diffuser system of FIG. 1, which view is taken essentially along the line 10-10 of FIG. 9.
Figure 11:
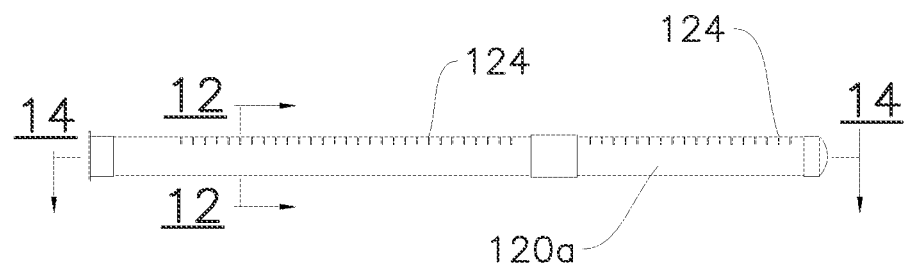
FIG. 11 is an enlarged side elevational view of a pipe leg of the upper spider diffuser system of FIG. 1.
Figures 12, 13:
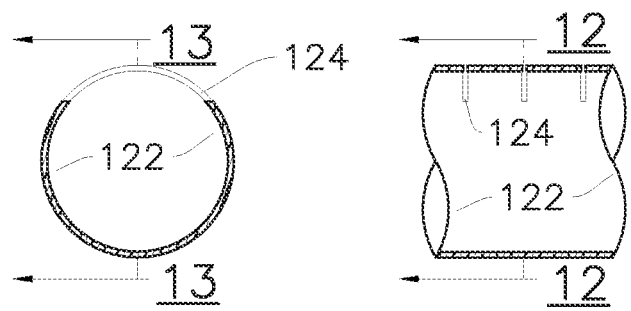
FIG. 12 is a enlarged cross-sectional view of the pipe leg taken along the line 12-12 of FIG. 11.
FIG. 13 is a cross-sectional view of the pipe leg taken along the line 13-13 of FIG. 12.
Figure 14:
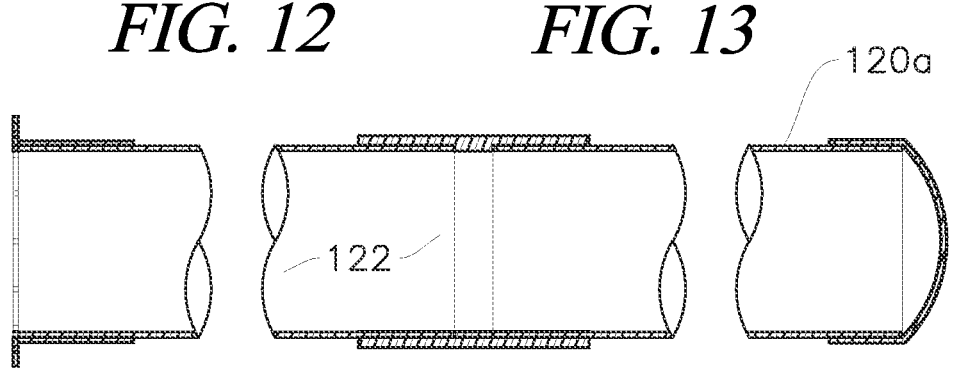
FIG. 14 is a cross-sectional view of the pipe leg taken along the line 14-14 of FIG. 11.
Figure 15A:
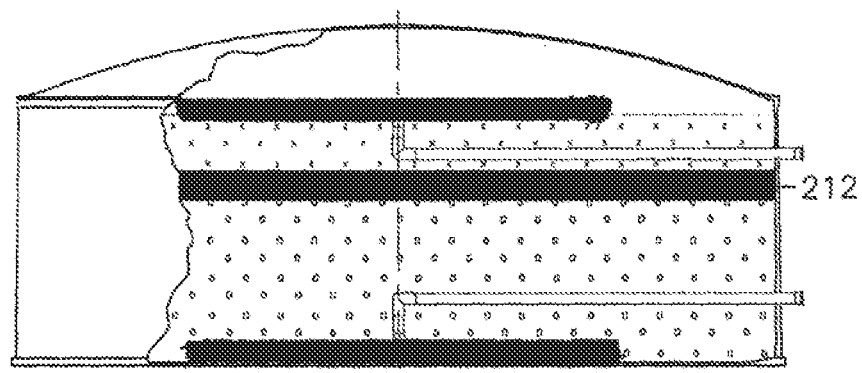
FIG. 15A is a schematic view of a prior art TES operation showing the characteristic position of the thermocline during off-peak hours.
Figure 15B:
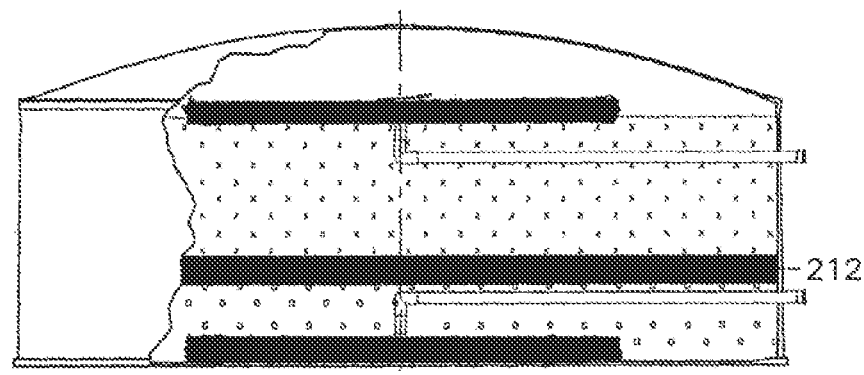
FIG. 15B is a schematic view of a prior art TES operation showing the characteristic position of the thermocline during peak hours.

Manifold structure 110 has a bottom plate 113, a cover 114 and an internal chamber 115. There is an opening 118 in bottom plate 113 (See FIG. 9) serving for introduction of water into chamber 115 or for discharge of water from chamber 115. Ideally, there may be a short stub 118a of piping connected to structure 110 at opening 118 to facilitate attachment of service piping 119 to opening 118. Stub 118a preferably may have an inside diameter that is the same size and shape as opening 118 and may be attached to the bottom plate 113 using a bolted flange or the like (not shown) or by welding. The height of structure 110 is generally not a critical design consideration.

System 102a also includes a diffuser pipe assembly 120 comprising a plurality of diffuser legs 120a. Each diffuser leg 120a is attached to manifold structure 110 so as to extend generally outwardly therefrom through space 108, and toward inner surface 106. In the preferred embodiment, diffuser legs 120a may extend generally radially outwardly from manifold structure 110, as shown with particularity in FIGS. 1 and 4.

Figure 5:
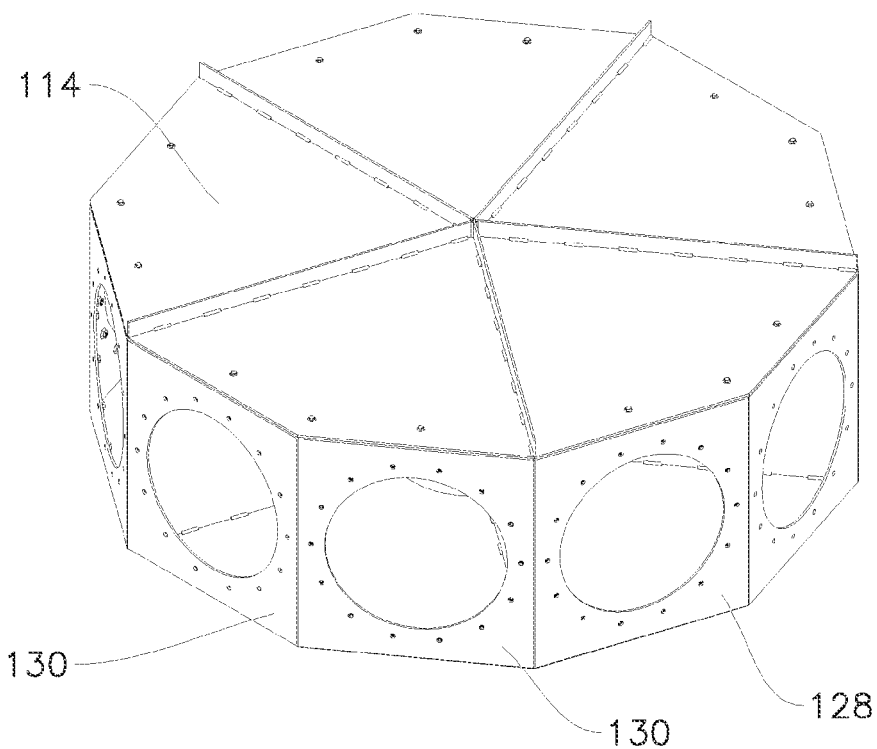
FIG. 5 is an isometric view of the manifold structure of the upper spider diffuser system of FIG. 1.
Figure 6:
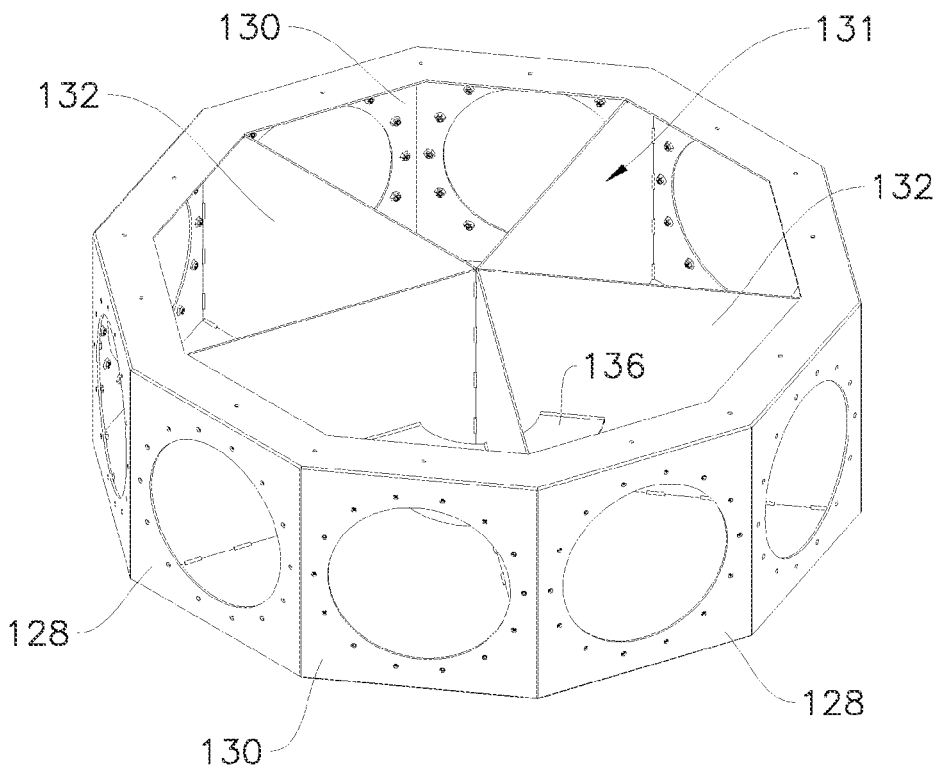
FIG. 6 is an isometric view similar to FIG. 5, except that the cover of the diffuser manifold structure is removed for increased clarity.
Figure 7:
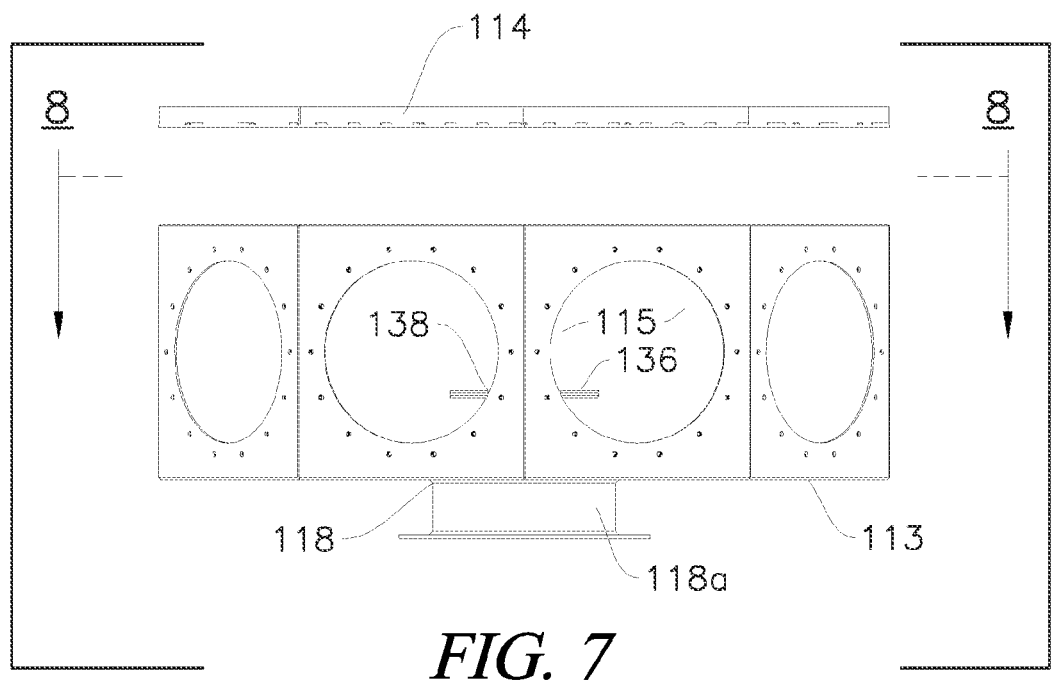
FIG. 7 is an exploded elevational view of the manifold structure of FIG. 5.
Figure 8:
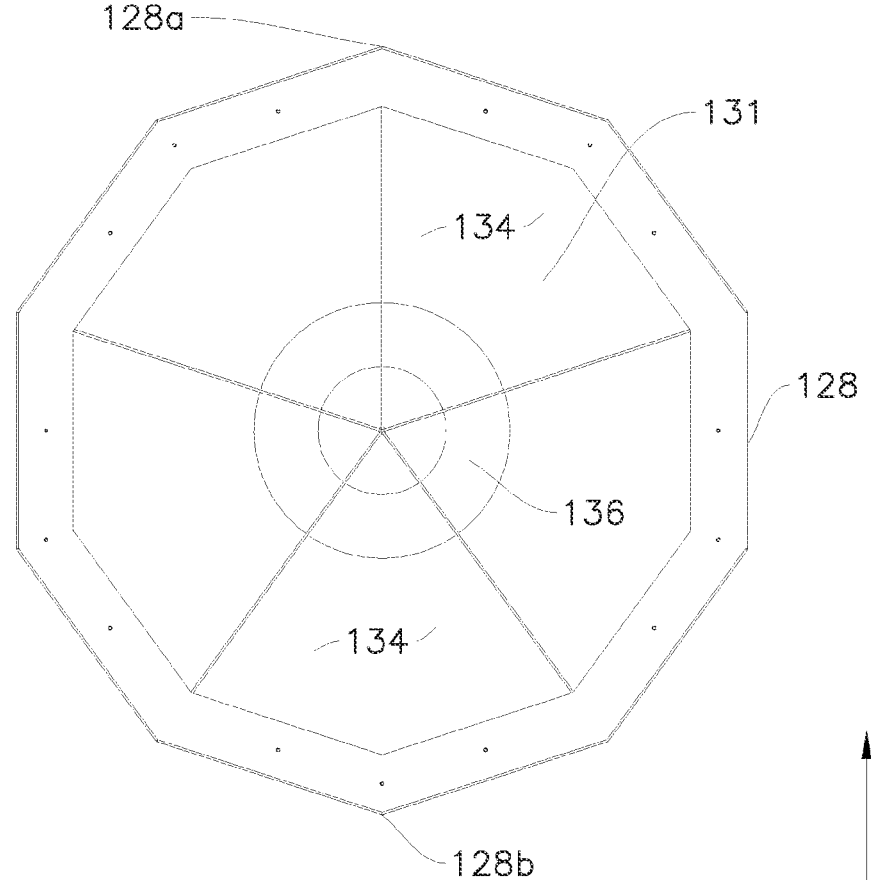
FIG. 8 is a cross-sectional view taken along the line 8-8 of FIG. 7.

Referring now to FIGS. 5-7, in the preferred embodiment of the invention, manifold structure 110 may desirably have a generally decagonal horizontal cross-sectional configuration and a peripheral wall 128 made up of ten upright wall segments 130. Segments 130 may desirably be joined together by welding. Alternatively, in accordance with the concepts and principles of the invention, the structure 110 might just as well have any number of substitute cross-sectional shapes, such as, for example, octagonal, triangular, cylindrical, rectangular, etc. With reference to FIG. 8, the wall 128 has opposed corners 128a, and 128b. These corners 128a, 128b are spaced apart across chamber 115 to present the largest horizontal dimension of manifold structure 110.

Structure 110 may include an internal baffle arrangement 131 disposed in chamber 115. Arrangement 131 preferably may include five partitions 132 dividing internal chamber 115 into five separate chamber sections 134. As can be seen in FIG. 6, chamber sections 134 are each bounded by two partitions 132 and two segments 130. Alternatively, arrangement 131 may further include a horizontally deposed disc baffle element 136 supported in corresponding slots 138 in partitions 132. A flange 120a' is provided for securing leg 120a to a corresponding segment 130 of wall 128. Suffice it to say that for practical purposes the vertical dimension of each segment 130 may be about 0.25" to 4" larger than the outside diameter of flange 120a' of radial diffuser leg 120a. Conveniently, the horizontal dimension of each segment 130 in a direction around the periphery of manifold structure 110 may be the same as the vertical dimension thereof such that the segments 130 are square.

With reference to FIGS. 10-13, each of the diffuser legs 120a has an elongated internal channel 122 that is in fluid communication with chamber 115. In the preferred embodiment shown in the drawings, the diffuser legs 120a ideally are all the same, so when reference to a singular diffuser leg 120a is made, such reference will apply equally to the other diffuser legs 120a. Each diffuser leg 120a has a plurality of slotted apertures 124 extending through the wall of diffuser leg 126. Apertures 124 are distributed along the length of diffuser leg 120a so as to intercommunicate channel 122 with space 108. As can best be seen in FIG. 4, spider diffuser system 102a has ten diffuser legs 120a, one for each segment 130 of the wall 128. If the design characteristics of the TES process mandate, diffuser legs 120a of differing numbers and/or alternating lengths might be called for.

Preferably, the ID of each diffuser leg 120a is essentially the same as the ID of pipe stub 118a, whereby the flow rate of the water entering chamber 115 via opening 118 is essentially ten times the flow rate of the water entering each diffuser leg 120a from chamber 115. Ideally, the arrangement of the manifold structure 110 is such that the water entering each diffuser leg 120a has a velocity of no more than about 1 ft/sec.

In accordance with the invention, a TES operation may be conducted using equipment as described above and the following process parameters and structural dimensions.

Spider Diffuser Design Calculations

Tank Dimensions, Flow Rates and Pipe Sizes

| | |
|---|---:|
| Thermal Storage Capacity of Tank 100 | 33000 ton hr |
| Required Volume for Tank 100 | 3,200,000 gal |

-continued

| | |
|---|---|
| Additional Capacity of Tank 100 for design purposes | 16638 gal |
| Time Required for Discharging Tank 100 | 6.8817 hr |
| Height of Tank 100 | 40 ft |
| Inner Diameter (ID) of Tank 100 | 116.69 ft |
| Horizontal Cross-sectional Area of Tank 100 | 10694 ft$^2$ |
| Temperature of Return Warm Water | 58° F. |
| Temperature of Outlet Chilled Water | 42° F. |
| Temperature Differential (ΔT) | 16° F. |
| Maximum Flow Rate of Water from Tank 100 Including 110% Safety Factor | 7750 gpm |
| ID of Pipe Stub 118a | 18.743 in |
| OD of Pipe Stub 118a | 20 in |
| Internal Cross-Sectional Area of Pipe Stub 118a | 275.9104 in$^2$ |
| FOM of Storage Tank 100 | 0.93 |

Spider Diffuser System Dimensions & Pipe Sizes, Etc.

| | |
|---|---|
| Width of Manifold Structure 110 between opposite corners 128a, 128b | 75 in |
| Number of upright wall segments 130 | 10 |
| Number of Diffuser Legs 120a | 10 |
| Length of each Diffuser Leg 120a | 27 ft |
| ID of Each Diffuser Leg 120a | 18.743 in |
| OD of Each Diffuser Leg 120a | 20 in |
| Flow Rate of Water into Each Diffuser Leg 120a | 775 gpm |
| Maximum Fluid Velocity in Diffuser Legs 120 | ~1.0 ft/sec |
| Maximum Flow Velocity into Chamber 110 | 10 ft/sec |
| Diffuser Pressure Drop | 0.9365 psi |

Slot Characteristics:

| | |
|---|---|
| Width of Each Slot 138 | 0.375 in |
| Length of Each Slot 138 | 17.3837 |
| Depth of Each Slot 138 | 3.75 in |
| Nozzle Area of Each Slot 138 | 6.5189 in$^2$ |
| Number of Slots 138 in Each Radial Leg 120a | 47 |
| Pitch of Slots 138 | 5.86 in |
| Total Number of Slots 138 in System 102a | 470 |
| Slot 138 Nozzle Angle ($\theta_1$) | 106.2816 deg |

Figure 16:
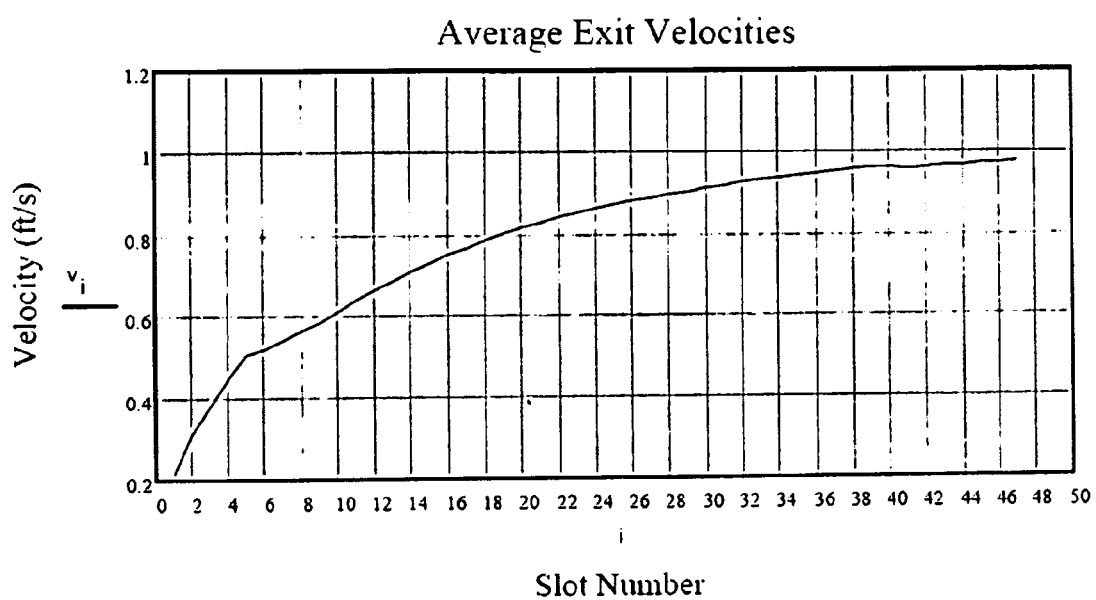
FIG. 16 is a graph that plots the exit velocities for water exiting the leg and entering the space in the tank via the slots. The abscissa of the graph plots the slot numbers with the highest number representing the slot that is farthest from the manifold structure.

FIG. 16 plots the exit velocities for water exiting leg 120a and entering space 108 in tank 100 via slots 138. In this graph, the abscissa plots the slot numbers with the highest number representing the slot 138 that is farthest from manifold structure 110.

By employing the foregoing parameters in conducting a TES operation using the spider diffuser system assemblage 102 as described above mounted in a tank 100, a thermocline having a thickness of one to three feet between the warm and cold water may be developed and maintained during the charge and discharge cycles and throughout normal commercial operations.

I claim:

1. A spider diffuser system for use in a thermal energy storage tank, said tank comprising an outer wall having an inner surface surrounding a hollow internal space in the tank, said spider diffuser system comprising:
    a centrally disposed manifold structure,
    said spider diffuser system being arranged for mounting in the space with said manifold structure in vertically spaced relationship relative to a thermocline formed in a temperature stratifiable liquid in the space during operation of the tank,
    said manifold structure having:
    an internal chamber,
    an opening for introduction of the liquid into said internal chamber or for discharge of the liquid from said internal chamber, and
    an internal baffle arrangement in said internal chamber, wherein said internal baffle arrangement comprises a plurality of attached upright partitions that divide said internal chamber into multiple, separate chamber sections, causing the liquid moving through said opening to be divided into said chamber sections and reduced in velocity as the liquid enters said chamber sections during operation of the tank;
    a diffuser pipe assembly configured to promote temperature stratification of the liquid during operation of the tank, said diffuser pipe assembly comprising a plurality of elongated diffuser legs, said diffuser legs being attached to said manifold structure, so as to extend generally radially outwardly from said manifold structure, wherein each diffuser leg has
    an internal channel in fluid communication with said manifold structure and a plurality of apertures distributed along the length of said diffuser leg, said apertures intercommunicating with said internal channel.

2. The spider diffuser system as set forth in claim 1, wherein said diffuser legs extend generally radially outwardly from said manifold structure, such that said diffuser legs are substantially parallel to the surface of the liquid in the tank.

3. The spider diffuser system as set forth in claim 1, wherein said manifold structure has a polygonal, generally horizontal cross-sectional configuration and a peripheral wall including a plurality of upright wall segments, and wherein one diffuser leg extends outwardly from each wall segment.

4. The spider diffuser system as set forth in claim 3, further comprising a flange securing each diffuser leg to a corresponding wall segment.

5. The spider diffuser system as set forth in claim 4, wherein said wall segments have an opening that is approximately equal to the diameter of said diffuser legs.

6. The spider diffuser system as set forth in claim 1, wherein said apertures are disposed on said diffuser leg facing generally away from a thermocline in the liquid.

7. The spider diffuser system as set forth in claim 1, wherein said internal baffle arrangement further comprises a disc baffle positioned between, and horizontal to, the plurality of upright partitions.

8. The spider diffuser system as set forth in claim 7, further comprising one or more slots in each upright partition into which said disc baffle is disposed so as to be supported on said plurality of partitions.

9. A thermal energy storage installation including a thermal energy storage tank and a spider diffuser system in said tank, said tank comprising an outer wall surrounding a hollow internal space in said tank, said spider diffuser system comprising:
    a manifold structure disposed centrally in said tank,
    said spider diffuser system being arranged for mounting in said space with the manifold structure in vertically spaced relationship relative to a thermocline formed in a temperature stratifiable liquid in said space during operation of said tank,
    said manifold structure having:
    an internal chamber,
    an opening for introduction of the liquid into said internal chamber or discharge of the liquid from said internal chamber, and
    an internal baffle arrangement in said internal chamber, wherein said internal baffle arrangement comprises a plurality of attached upright partitions that divide said internal chamber into multiple, separate chamber sections, causing the liquid moving through said opening to be divided into said chamber sections and reduced in velocity as the liquid enters said chamber sections during operation of said tank;

a diffuser pipe assembly configured to promote temperature stratification of the liquid during operation of said tank, said diffuser pipe assembly comprising a plurality of elongated diffuser legs, said diffuser legs being attached to said manifold structure so as to extend generally radially outwardly from said manifold structure and toward said inner surface of said tank, wherein each diffuser leg has an internal channel in fluid communication with said internal chamber and a plurality of apertures distributed along the length of said diffuser leg, said apertures intercommunicating said internal channel with said space.

10. The thermal energy storage installation as set forth in claim 9, comprising a first spider diffuser system and a second spider diffuser system in vertically spaced relationship and positioned in oppositely facing dispositions within said tank.

11. The thermal energy storage installation as set forth in claim 10, wherein said first spider diffuser system is configured to be substantially a mirror-image of the configuration of said second spider diffuser system.

12. The thermal energy storage installation as set forth in claim 11, where at least one diffuser leg extends generally outwardly from each chamber section.

13. The thermal energy storage installation as set forth in claim 10, wherein said first spider diffuser system is positioned at or near to the top of said tank and said second spider diffuser system is positioned at or near to the floor of said tank.

14. The thermal energy storage installation as set forth in claim 9, wherein said diffuser legs extend generally radially outwardly from said manifold structure, such that said diffuser legs are substantially parallel to the surface of the liquid in said tank when in operation.

15. The thermal energy storage installation as set forth in claim 9, wherein said manifold structure has a polygonal, generally horizontal cross-sectional configuration and a peripheral wall including multiple upright wall segments, wherein one diffuser leg extends from each wall segment.

16. The thermal energy storage installation as set forth in claim 9, wherein said baffle arrangement further comprises a disc baffle positioned between and horizontal to said plurality of upright partitions.

17. The thermal energy storage installation as set forth in claim 16, further comprising one or more slots in each upright partition into which said disc baffle is disposed to be supported on said plurality of partitions.

18. The thermal energy storage installation as set forth in claim 16, further comprising a flange securing each diffuser leg to a corresponding wall segment.

19. The thermal energy storage installation as set forth in claim 18, wherein said wall segments have an opening that is approximately equal to the diameter of the diffuser legs.

20. The thermal energy storage installation as set forth in claim 9, wherein said apertures are disposed on said diffuser leg facing generally away from a thermocline in the liquid.

21. A thermal energy storage tank including a spider diffuser system in said tank, said tank comprising an outer wall having an inner surface surrounding a hollow internal space in said tank, said spider diffuser system comprising:

a manifold structure centrally disposed in said tank, said spider diffuser system being arranged for mounting in said space with said manifold structure in vertically spaced relationship relative to a thermocline formed in a temperature stratifiable liquid in said space during operation of said tank, said manifold structure having an internal chamber, an opening adapted for introduction of the liquid into said internal chamber or discharge of the liquid from said internal chamber, and an internal baffle arrangement in said internal chamber, wherein said internal baffle arrangement comprises a plurality of attached upright partitions that divide said internal chamber into multiple, separate chamber sections, causing the liquid moving through said opening to be divided into said chamber sections and reduced in velocity as the liquid enters said chamber sections during operation of said tank;

a diffuser pipe assembly configured to promote temperature stratification of the liquid during operation of said tank, said diffuser pipe assembly comprising a plurality of elongated diffuser legs, said diffuser legs being attached to said manifold structure so as to extend generally radially outwardly from said manifold structure, each diffuser leg having an internal channel in fluid communication with said internal chamber and a plurality of apertures distributed along the length of said diffuser leg, said apertures intercommunicating said internal channel with said space.

22. The thermal energy storage tank as set forth in claim 21, comprising a first spider diffuser system and a second spider diffuser system in vertically spaced relationship and positioned in oppositely facing dispositions within said tank.

23. The thermal energy storage tank as set forth in claim 22, wherein said first spider diffuser system is configured to be substantially a mirror-image of the configuration of said second spider diffuser system.

24. The thermal energy storage tank as set forth in claim 23, where at least one diffuser leg extends generally outwardly from each chamber section.

25. The thermal energy storage tank as set forth in claim 22, wherein said first spider diffuser system is positioned at or near to the top of said tank and said second spider diffuser system is positioned at or near to the floor of said tank.

26. The thermal energy storage tank as set forth in claim 21, wherein said diffuser legs extend generally radially outwardly from said manifold structure, such that said diffuser legs are substantially parallel to the surface of the liquid in said tank.

27. The thermal energy storage tank as set forth in claim 21, wherein said manifold structure has a polygonal, generally horizontal cross-sectional configuration and a peripheral wall including multiple upright wall segments, wherein one diffuser leg extends from each wall segment.

28. The thermal energy storage tank as set forth in claim 21, wherein said baffle arrangement further comprises a disc baffle positioned between and horizontal to said plurality of upright partitions.

29. The thermal energy storage tank as set forth in claim 28, further comprising one or more slots in each upright partition into which said disc baffle is disposed to be supported on said plurality of partitions.

30. The thermal energy storage tank as set forth in claim 28, further comprising a flange securing each diffuser leg to a corresponding wall segment.

31. The thermal energy storage tank as set forth in claim 30, wherein the wall segments have an opening that is approximately equal to the diameter of said diffuser legs.

32. The thermal energy storage tank as set forth in claim 21, wherein said apertures are disposed on the diffuser leg facing generally away from a thermocline in the liquid.

\* \* \* \* \*